(12) United States Patent
Bowdoin et al.

(10) Patent No.: US 7,028,721 B2
(45) Date of Patent: Apr. 18, 2006

(54) METHOD AND APPARATUS FOR FLUID DYNAMIC BEARING MOTOR LUBRICATING FLUID INJECTION

(75) Inventors: James Scott Bowdoin, Aptos, CA (US); James Sidney Lee, San Jose, CA (US); Sanjay Champaklal Sheth, Sunnyvale, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 103 days.

(21) Appl. No.: 10/744,714

(22) Filed: Dec. 23, 2003

(65) Prior Publication Data

US 2004/0206577 A1    Oct. 21, 2004

Related U.S. Application Data

(60) Provisional application No. 60/463,473, filed on Apr. 16, 2003.

(51) Int. Cl.
*B65B 1/04* (2006.01)
(52) U.S. Cl. .................... 141/59; 141/67; 184/55.1
(58) Field of Classification Search ............... 141/67, 141/59, 286, 65; 184/29, 6.22, 55.1, 55.2, 184/57; 384/100, 107; 277/80
See application file for complete search history.

(56) References Cited

U.S. PATENT DOCUMENTS

| 5,575,355 A | * | 11/1996 | Williams et al. | ............ | 184/55.1 |
| 5,601,125 A | * | 2/1997 | Parsoneault et al. | .......... | 141/51 |
| 6,305,439 B1 | * | 10/2001 | Pool et al. | ..................... | 141/4 |

* cited by examiner

*Primary Examiner*—Steven O. Douglas
(74) *Attorney, Agent, or Firm*—Morrison & Foerster LLP

(57) ABSTRACT

A method and apparatus for filling a motor having a fluid dynamic bearing is provided. In one embodiment, a method for filling a motor having a fluid dynamic bearing having at least two passages coupling the bearing to the surrounding environment includes the steps of moving a fluid injection tool into contact with the fluid bearing motor, sealing the fluid injection tool to the fluid bearing motor, and injecting fluid from the fluid injection tool into a first passage coupled to the fluid dynamic bearing. In one embodiment, an apparatus for filling a motor having a fluid dynamic bearing having at least two passages coupling the bearing to the surrounding environment includes a body coupled to an actuator and fluid transfer mechanism. The actuator is adapted to move the body and fluid transfer mechanism is adapted to dispense fluid through a fluid port formed in the body. A seal is coupled to the body and adapted to seal the fluid port to a fluid bearing injection motor during filling.

12 Claims, 5 Drawing Sheets

METHOD AND APPARATUS FOR FLUID DYNAMIC BEARING MOTOR LUBRICATING FLUID INJECTION

CROSS REFERENCE TO RELATED APPLICATIONS

This application claims the priority of U.S. Provisional Application No. 60/463,473, filed Apr. 16, 2003 by Bowdoin, et al. (entitled "FDB Motor Lubricating Fluid Injection Fill Process"), which is herein incorporated by reference.

FIELD OF THE INVENTION

The invention generally relates to electric motors and, more particularly, to a method and apparatus for filling fluid dynamic bearings of electric motors utilized for disk drives.

BACKGROUND OF THE INVENTION

Disk drives are capable of storing large amounts of digital data in a relatively small area. Disk drives store information on one or more recording medias, which conventionally take the form of circular storage disks having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a sleeve, to which the spindle is attached, having a sleeve into which the shaft is inserted. Permanent magnets attached to the sleeve interact with a stator winding on the base plate to rotate the sleeve relative to the shaft. In order to facilitate rotation, one or more bearings are usually disposed between the sleeve and the shaft.

From the foregoing discussion, it can be seen that the bearing assembly which enables the storage disk to rotate is of critical importance. One bearing design is a fluid dynamic bearing. In a fluid dynamic bearing, a lubricating fluid such as oil, among other fluids, provides a bearing surface between fixed and rotating members of the motor. Fluid dynamic bearings spread the bearing surface over a large surface area, as opposed to a ball bearing assembly, which comprises a series of point interfaces. This bearing surface distribution is desirable because the increased bearing surface reduces wobble or run-out between the rotating and fixed members. Further, the use of fluid in the interface area imparts damping effects to the bearing, which helps to reduce non-repeatable run-out. Thus, fluid dynamic bearings are an advantageous bearing system.

The internal lubricating fluid volume of fluid dynamic bearings utilized in FDB motors must be substantially free of trapped air during motor operation to maximize drive performance. External motor reservoirs typically do not have the capacity to hold the total required lubricating fluid volume. Thus, air trapped must be removed before filling the internal lubricating fluid volume of fluid dynamic bearings.

In order to remove the air trapped within the bearing, a vacuum filling process has been developed where the FDB motor is partially filled before a vacuum is applied to extract air from the internal areas of the bearing. The remaining lubricating fluid is added and the vacuum is released, thereby drawing the fluid into the motor. However, during the application of the vacuum, air may be violently expelled from the bearing, causing lubricating fluid within the bearing to exit the motor. Additionally, the escaping air may create an air channel void of lubricating fluid necessary to fill internal area when vacuum is released, and thus the filling process fails as trapped air is not totally removed.

Moreover, current fluid dynamic bearing designs generally include a space for lubricating fluid expansion and therefore a portion of the total available lubricating fluid reservoir volume must remain unfilled. However, entrained air and lubricating fluid will fill almost 100 percent of the bearing reservoir volume. At this point, the bearing does not have any additional space to accommodate expansion in fluid volume due to temperature change.

Therefore, a need exists for a method and apparatus for efficiently filling fluid dynamic bearings.

SUMMARY OF THE INVENTION

A method and apparatus for filling a motor having a fluid dynamic bearing is provided. In one embodiment, a method for filling a motor having a fluid dynamic bearing having at least two passages coupling the bearing to the surrounding environment includes the steps of moving a fluid injection tool into contact with the fluid bearing motor, sealing the fluid injection tool to the fluid bearing motor, and injecting fluid from the fluid injection tool into a first passage coupled to the fluid dynamic bearing.

In one embodiment, an apparatus for filling a motor having a fluid dynamic bearing having at least two passages coupling the bearing to the surrounding environment includes a body coupled to an actuator and fluid transfer mechanism. The actuator is adapted to move the body and fluid transfer mechanism is adapted to dispense fluid through a fluid port formed in the body. A seal is coupled to the body and adapted to seal the fluid port to a fluid bearing injection motor during filling.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

The invention generally provides a method and apparatus for filling a fluid dynamic bearing motor with bearing fluid in a manner that advantageously reduces the presence of trapped area within the bearing surfaces. Although the method is illustratively described with reference to an exemplary embodiment of a fluid dynamic bearing motor depicted in FIGS. 1 and 3–4, the method may be beneficially practiced with fluid dynamic bearing motors having other configurations that allow fluid to be introduced into the fluid dynamic bearing while allowing gas to be expelled from at least one passage coupling the bearing to the surrounding environment.

Figure 1:
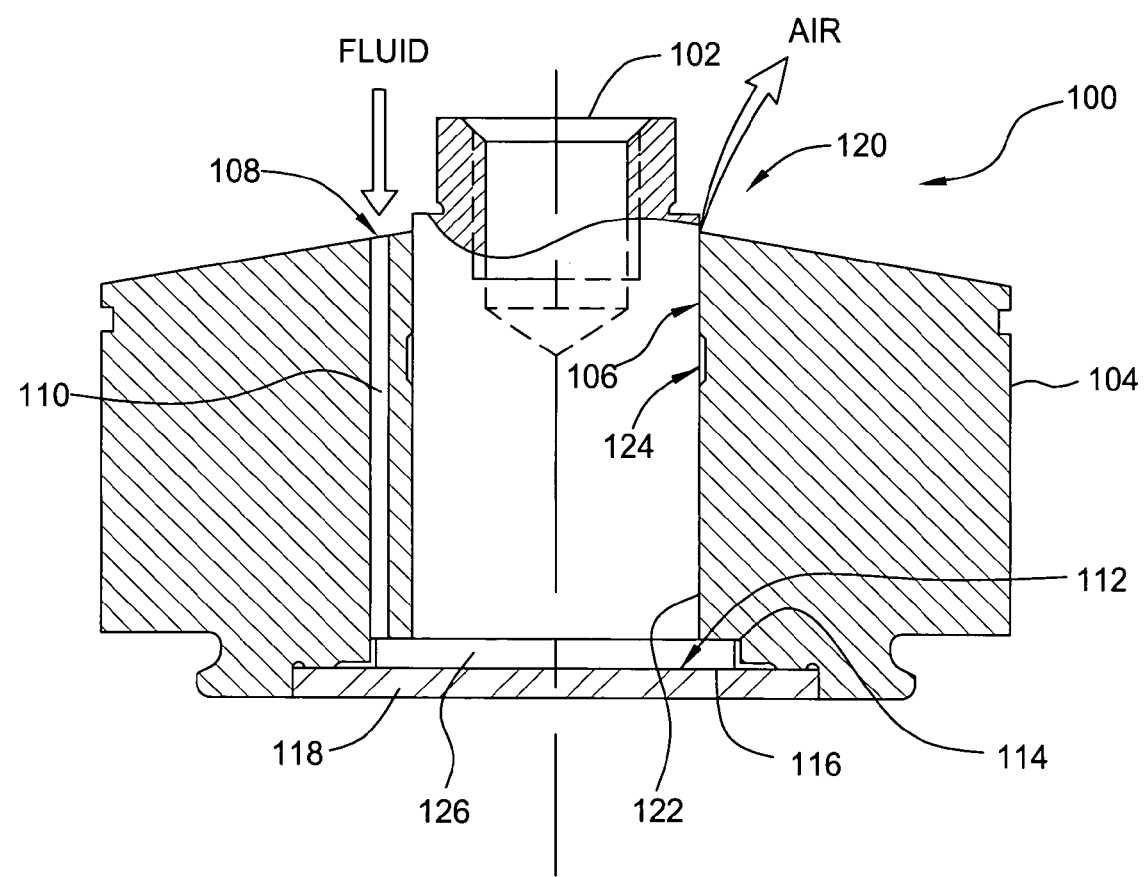
FIG. 1 depicts a simplified fluid dynamic bearing (FDB) motor suitable for use in disc drive applications in which the filling process of the present invention may be practiced.

FIG. 1 depicts a simplified partially assembled fluid dynamic bearing (FDB) motor 100 suitable for use in disc drive applications in which the filling process of the present invention may be illustrated. The FDB motor 100 includes a sleeve 104 and a shaft 102 having a fluid dynamic bearing 106 disposed therebetween. The sleeve 104 generally is coupled to disc carrier and a media disc pack that is rotated about the shaft 102 by a stator. For simplicity, the disc carrier, disc pack and stator are not shown in FIG. 1.

In the embodiment of FIG. 1, the fluid dynamic bearing 106 includes a journal 122 and a thrust bearing 112 through which lubricant is pumped. The journal 122 is defined between the sleeve 104 and shaft 102. The thrust bearing 112 includes an upper working surface 114 and a lower working surface 116 defined on respective sides of a thrust plate 126 fixed to the shaft 102. The upper working surface 114 is defined between the thrust plate 126 and a portion of the sleeve 104. The lower working surface 116 is defined between the thrust plate 126 and a counter plate 118 fixed to the sleeve 104. The fluid dynamic bearing 106 may also include a reservoir 124 disposed between the shaft and 102 and sleeve 104 to accommodate expansion of the bearing lubricant during operation.

The fluid dynamic bearing 106 includes at least two passages open to the environment outside the FDB motor 100. A first passage is adapted to allow lubricant to be injected or otherwise flowed into the fluid dynamic bearing 106. A second passage of the fluid dynamic bearing 106 allows air to escape to the environment surrounding the FDB motor 100 as lubricant is added to the fluid dynamic bearing 106 through the first passage.

In the embodiment depicted in FIG. 1, the first passage of the fluid dynamic bearing 106 is a port 108 formed in the sleeve 104 and fluidly coupled to the fluid dynamic bearing 106 through a vent passage 110 formed through the sleeve 104. The second passage is an annular gap 120 defined where the shaft 102 exits the top of the sleeve 104. It is contemplated that the passages of the fluid dynamic bearing 106 open to the surrounding environment may be defined between or through other FDB motor 100 components.

Thus, as lubricating fluid is introduced through the vent passage 110 into the fluid dynamic bearing 106, displaced air is driven out of the gap 120. A combination of factors, such as viscosity, density, surface energy and surface tension allows the air to move more readily within the bearing 106 relative to the lubricating fluid, causing the air to be advantageously purged from the bearing journals, reservoirs and circulation paths, thereby promoting robust motor performance. The present invention is useful with this and other forms of fluid dynamic bearings and is not limited to use with this particular configuration.

Figure 2:
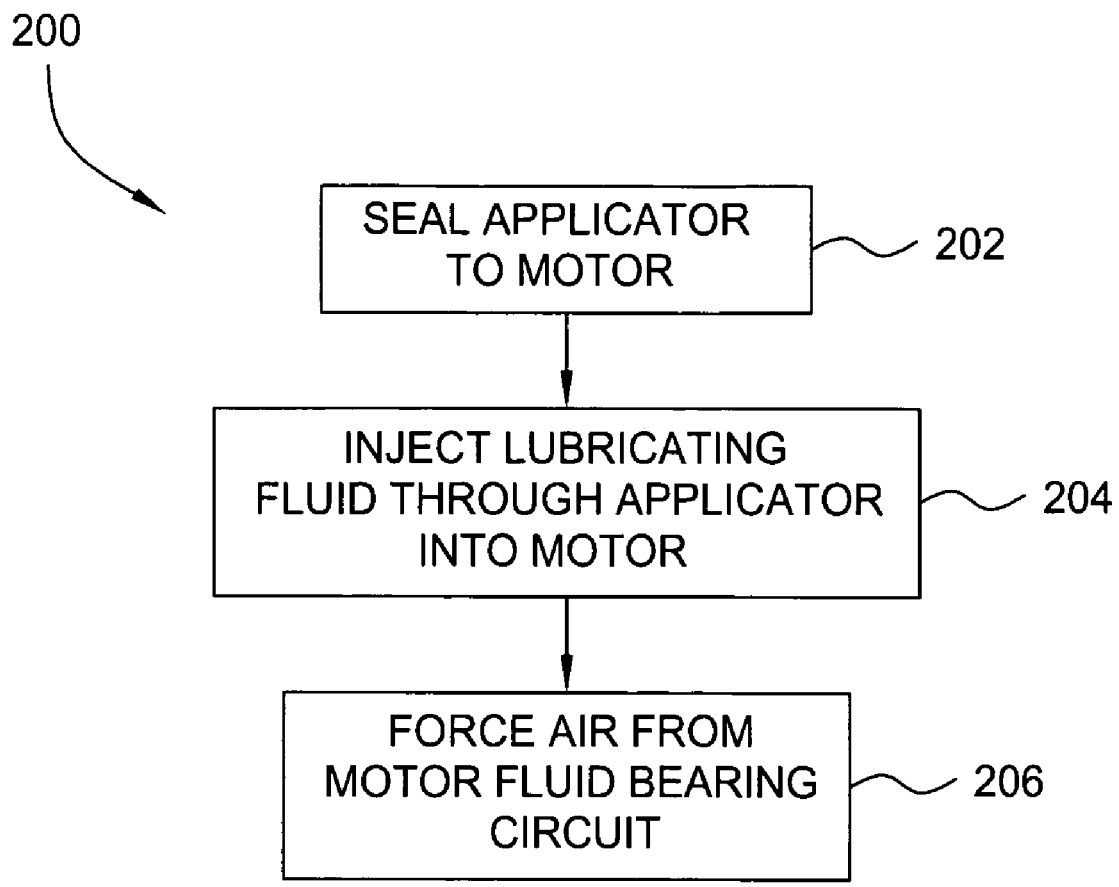
FIG. 2 is a flow diagram of one embodiment of a method for filling a fluid dynamic bearing motor according to the present invention.

FIG. 2 depicts flow diagram of one embodiment of a method 200 for filling a FDB motor. The method 200 begins at step 202 by sealing a lubricating fluid applicator a first passage coupling the fluid dynamic bearing of the motor to the surrounding environment. By sealing the applicator to the motor, the lubricating fluid may be injected into the fluid dynamic bearing with enough pressure to displace air within the bearing and force the air out through the second end of the bearing as subsequently described. At step 204, lubricating fluid is injected into the bearing with sufficient force to overcome the backpressure created by the air and/or fluid moving through the various components of the bearing. The method ends at step 206 where air is force from the fluid dynamic bearing through a second passage coupling the bearing to the surrounding environment, thereby allowing the lubricant to fill the voids of the bearing while eliminating trapped air. In one embodiment, air is expelled from the fluid dynamic bearing by injecting the lubricant at least 80 to about 90 (psi) to overcome the pressure drop across the bearing fluid circulation path of the fluid dynamic bearing.

Figure 3:
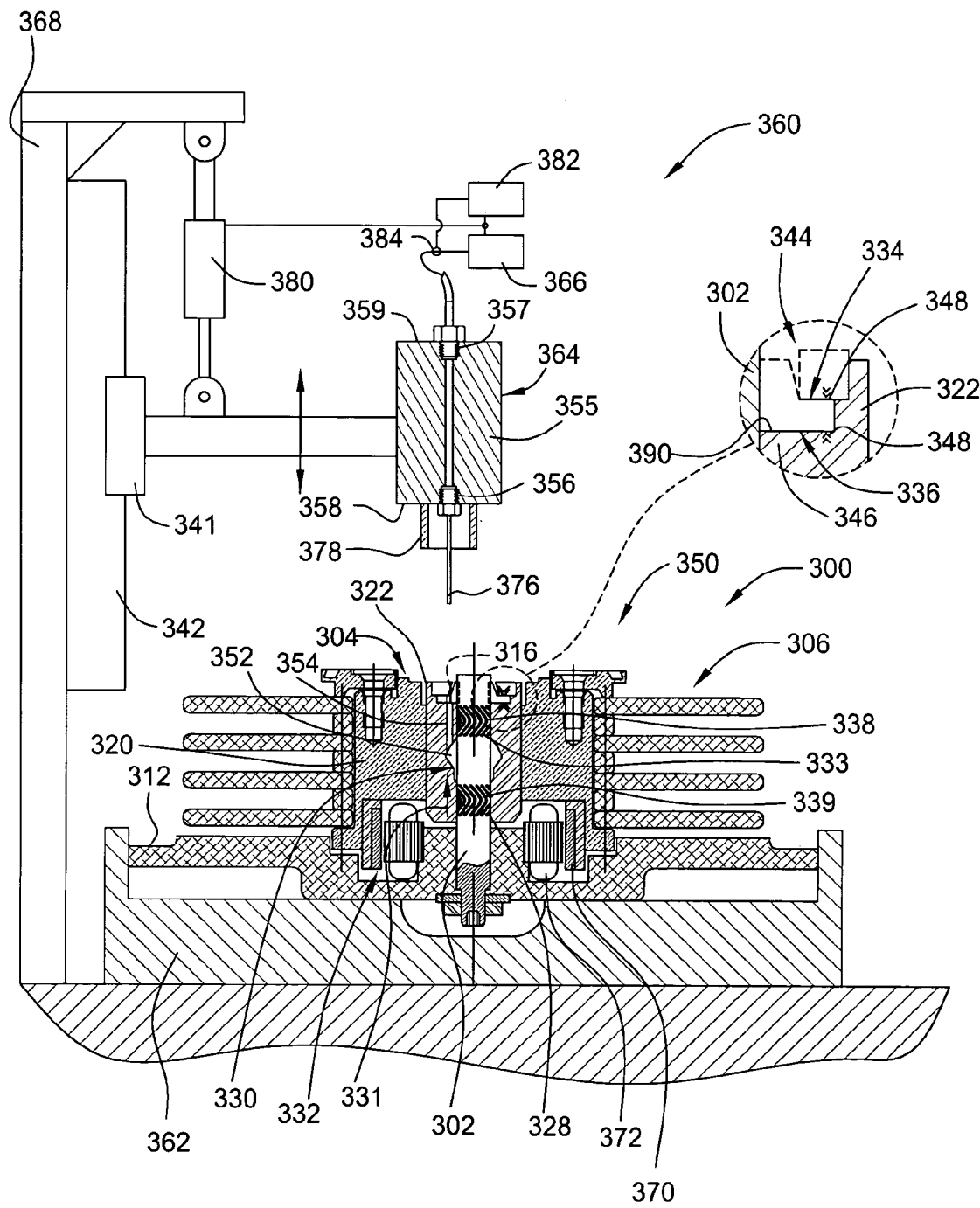
FIG. 3 depicts a cross-sectional view of one embodiment of a fluid dynamic bearing filling station.

FIG. 3 depicts an exemplary embodiment of a partially assembled fluid dynamic bearing (FDB) motor 350 of a disc drive 300 disposed in a bearing fluid fill station 360 in which one embodiment of the method 200 for filling the motor with lubricating fluid may be practiced. The bearing fluid fill station 360 is adapted to facilitate filling the FDB motor 350 with lubricating fluid at a predefined stage of assembly of the disc drive 300.

The FDB motor 350 of FIG. 3 includes a stationary member (shaft) 302, a sleeve 304 and a stator 332. The sleeve 304 is disposed around the shaft 302 and includes a disc carrier member 320 concentrically coupled around a sleeve 322. The disc carrier member 320 supports a disc pack 306 for rotation about shaft 302. The shaft 302 is supported at least at one end, and in the embodiment depicted in FIG. 3, is secured at a first end to a base 312 to provide a rigid axis about which the sleeve 304 and disc pack 306 is rotated during operation. The shaft 302 may be coupled to the base 312 by any number of means, including rivets, welding, staking, brazing, fastening (such as screws or nuts), bonding, and clamping, among other methods of securing.

A permanent magnet 370 with a plurality of magnet poles is attached to the sleeve 304, with the sleeve 304 and magnet 370 acting as a rotor for the FDB motor 350. In the embodiment depicted in FIG. 3, the magnet 370 is coupled to an inner facing flange of the disc carrier member 320.

The stator 332 is coupled to the base 312 radially inward of the magnets 370. The stator 332 is generally formed of a stack of stator laminations and associated stator windings, collectively labeled 372 in FIG. 3. The rotor is rotated about the shaft 302 by sequentially energizing the stator windings 372 to alternatively repel and attract the magnetic poles of the magnet 370, thereby creating a rotational force.

Rotation of the sleeve 304 about the shaft 302 is facilitated by a fluid dynamic bearing 330 formed therebetween. The fluid dynamic bearing 330 facilitates high speed rotation of the sleeve 302 around a central axis of the shaft 302 by providing a cushion of fluid, such as air, oil and the like, between the moving parts.

The fluid bearing 330 includes a radial working region or journal 333 and axial working regions 334, 336. The axial working regions 334, 336 form part of a thrust bearing 344 (shown in phantom) and is further described below. The radial journal 333 is defined between the inner diameter of the sleeve 322 and the outer diameter of the shaft 302. At least one of the shaft 302 and sleeve 322 includes pumping grooves 338, 339 that circulate and pressurize fluid along the working regions 333, 334, 336 of the bearing 330. To facilitate re-circulation of bearing fluid, at least one or more circulation passages 354 and an optional reservoir 352 are formed within at least one of the shaft 302, the sleeve 322 and the carrier member 320. At least one of the one or more circulation passages 354 provides for independent flow of bearing fluid through the journal bearing components for the purpose of decoupling the individual bearing forces.

The lower grooves 339 are asymmetric to the upper grooves 338 to allow fluid to be pumped in an upward direction (as shown by arrow 331) along the shaft 302 in bearing 330 as the lower grooves 339 in the lower journal functions as part of a pumping seal 328. Alternatively, the pumping seal may be defined by a separate grooved section (not shown) between the radial working region 332 of the bearing 330 and the lower end of the sleeve/shaft gap. Additionally, a capillary seal may be defined between divergent surfaces of the shaft 302 and the sleeve 304 to further provide fluid retention.

The thrust bearing 344 is shown in phantom in the embodiment depicted in FIG. 3 as the thrust bearing 344 is generally assembled after the injection of lubrication fluid into the bearing 330 and removal from the filling station 360. The thrust bearing 344 is show as it is contemplated that the bearing components may be configured to allow venting of the fluid bearing 330 or filling to the fluid bearing 330 through a passage formed through the thrust bearing components.

The thrust bearing 344 includes the axial working surfaces 334 and 336 of the fluid bearing 330. The thrust bearing 344 includes a thrust plate 346 coupled to the shaft 302 and a counter plate 348 coupled to the rotating sleeve 322. The thrust plate 346 and counter plate 348 cooperate to form the upper working region 334 while the thrust plate 346 and an upper surface 390 of the sleeve 322 cooperate to form the lower working region 336. At least one of the two surfaces respectively defining the upper and lower working regions 334, 336 of the thrust bearing 344 includes grooves (shown by chevrons 398) to pressurize and assist fluid movement through the thrust bearing 344. The upper and lower working regions 334, 336 of the thrust bearing 344 provide axial stability for the fluid bearing 330 and position the sleeve 304 relative to the shaft 302 within the FDB motor 350.

The counter plate 348 may optionally include a passage 316 formed therethrough that allows the bearing fluid to be re-circulated. In such embodiments, the passages 316, 354 may be aligned for filling, thereby allowing fluid filling of the bearing 330 with the thrust bearing 344 installed on the motor 350.

The fill station 360 generally includes a fixture 362, an applicator 364 and a fluid transfer device 366. The fixture 362 is adapted to locate and retain the FDB motor 350 relative to the applicator 364 during filling operations. The applicator 364 is generally retained in a pre-defined position relative to the fixture 362, and in the embodiment depicted in FIG. 3 is supported above the fixture 362 by a stanchion 368. The applicator 364 is coupled to the stanchion 368 by an actuator 380 which may be selectively activated to move the applicator 364 toward or away from the FDB motor 350 retained in the fixture 362.

In one embodiment, the applicator 364 is coupled to a guide 341 that is linearly positionable along a rail 342 coupled to the stanchion 368. The actuator 380 is coupled between at least one of the guide 341 or applicator 364 and the stanchion 368, and may be activated to position the applicator 364 long the rail 342, thereby controlling the elevation of the applicator 364 relative to the motor 350 disposed in the fixture 362. Suitable actuators may include, but are not limited to, pneumatic cylinders, hydraulic cylinders, servo motors, motorized lead or ball screws, linear actuators, solenoids or other suitable motion devices. Alternatively, the actuator 380 may be coupled to a controller 382 which controls the applicator movement and filling operations. The controller 382 may be, for example, a programmable logic device. In yet another embodiment, the actuator 370 may be manually operated to move the applicator 364.

The applicator 364 generally includes a body 355 having an outlet port 356 formed in a lower surface 358 facing the fixture 362 and an inlet port 357 formed in the upper surface 359. An annular seal 378 is coupled to the body 355 and circumscribes the outlet port 356. In one embodiment, the seal 378 is an elastomeric gasket compatible with the lubricating fluid coupled to the lower surface 358.

Figure 4:
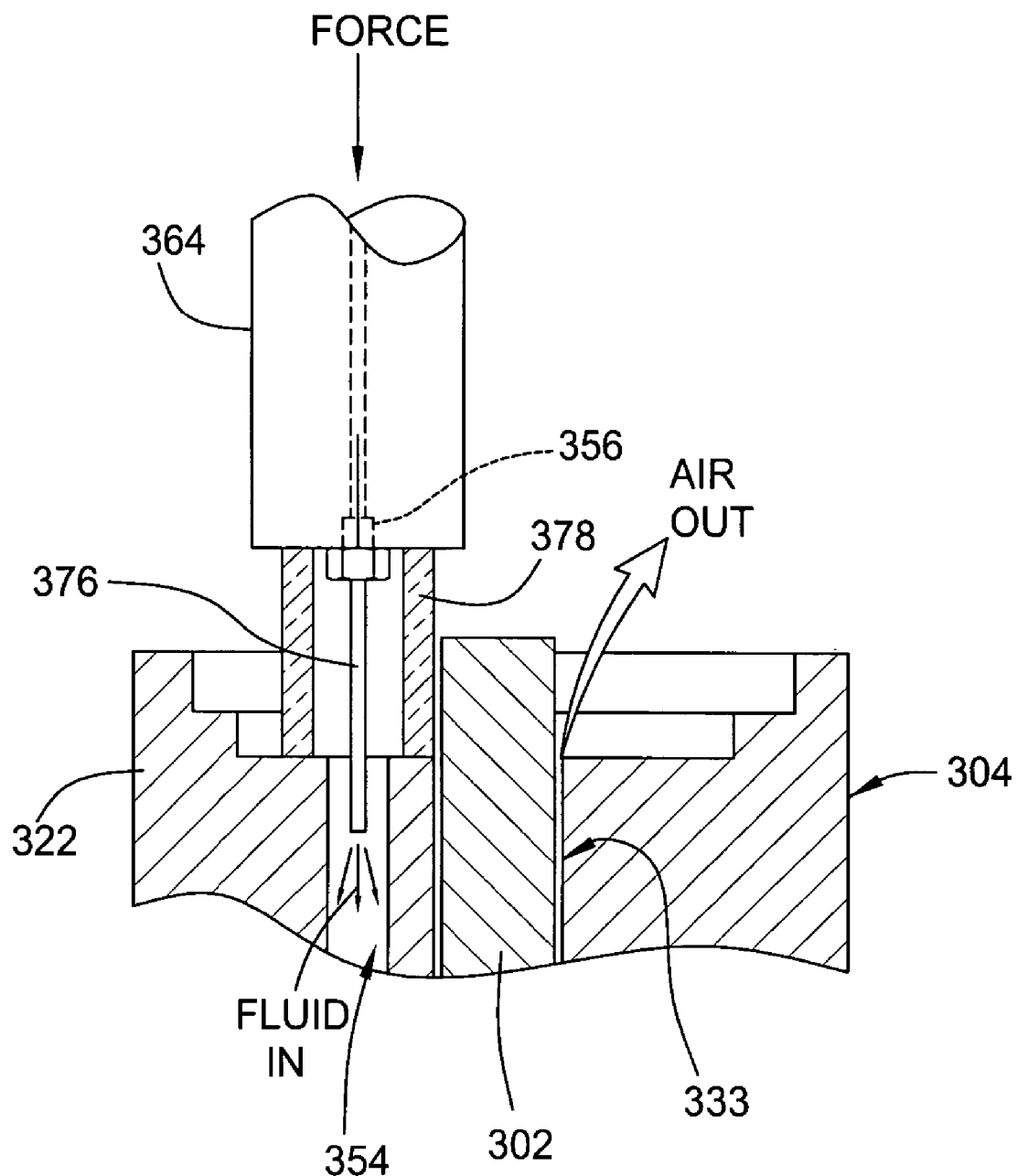
FIG. 4 is a partial view of fluid dynamic bearing filling station of FIG. 3.

An optional hollow needle 376 may be coupled to the outlet port 356 to facilitate injection of lubrication fluid into the recirculation passage 354. The needle 376 is configured to extend beyond the compressed seal 378 and partially enter the passage 354 when the applicator 364 is urged against the motor 350 as depicted in FIG. 4.

Continuing to refer to FIG. 3, the fluid transfer device 366 is coupled to the inlet port 357 of the applicator 364 and is adapted to move lubrication fluid through the outlet port 357 and into the bearing 330 of the motor 350. In one embodiment, the fluid transfer device 366 is a positive displacement device, such as a syringe or automated syringe pump. Other suitable fluid transfer devices 366 include peristaltic pumps, gear pumps, pressure fluid storage vessels, solenoid pumps, and metering pumps, among others devices suitable for delivering lubricating fluid into the bearing 330.

In operation, the FDB motor 350 is positioned in the fixture 362 of the filling station 360. The fixture 362 is configured to align the filling port of the FDB motor 350, which is in this embodiment the recirculation passage 354, with the outlet port 356 of the applicator 364.

The actuator 380 is energized to urge the seal 378 against the FDB motor 350 as the needle 376 enters the passage 354. The fluid transfer device 366 is activated to inject lubricating fluid into the bearing 330 of the FDB motor 350. The fluid transfer device 366 pressurizes the injecting lubrication fluid to a level that forces air from the bearing 330.

The amount of lubrication fluid injected into the fluid dynamic bearing may be controlled by metering the volume disposed by the fluid transfer device 366. Volume may be metered inherently correlated to positive displacement, number of cycles, revolutions or run time in conventional fluid transfer devices 366. Alternatively, a sensor 384 may be disposed between the applicator 364 and the fluid transfer device 366 to provide the controller 382 with a metric indicative of the amount of lubrication fluid disposed in the bearing. Using the information provided by the controller 382, the controller 382 regulates the operation of the fluid transfer device 366 such that a predefined amount of lubrication fluid is provided to the bearing 330. Examples of metrics indicative of the volume detected by the sensor 384 may include flow and pressure.

Figure 5:
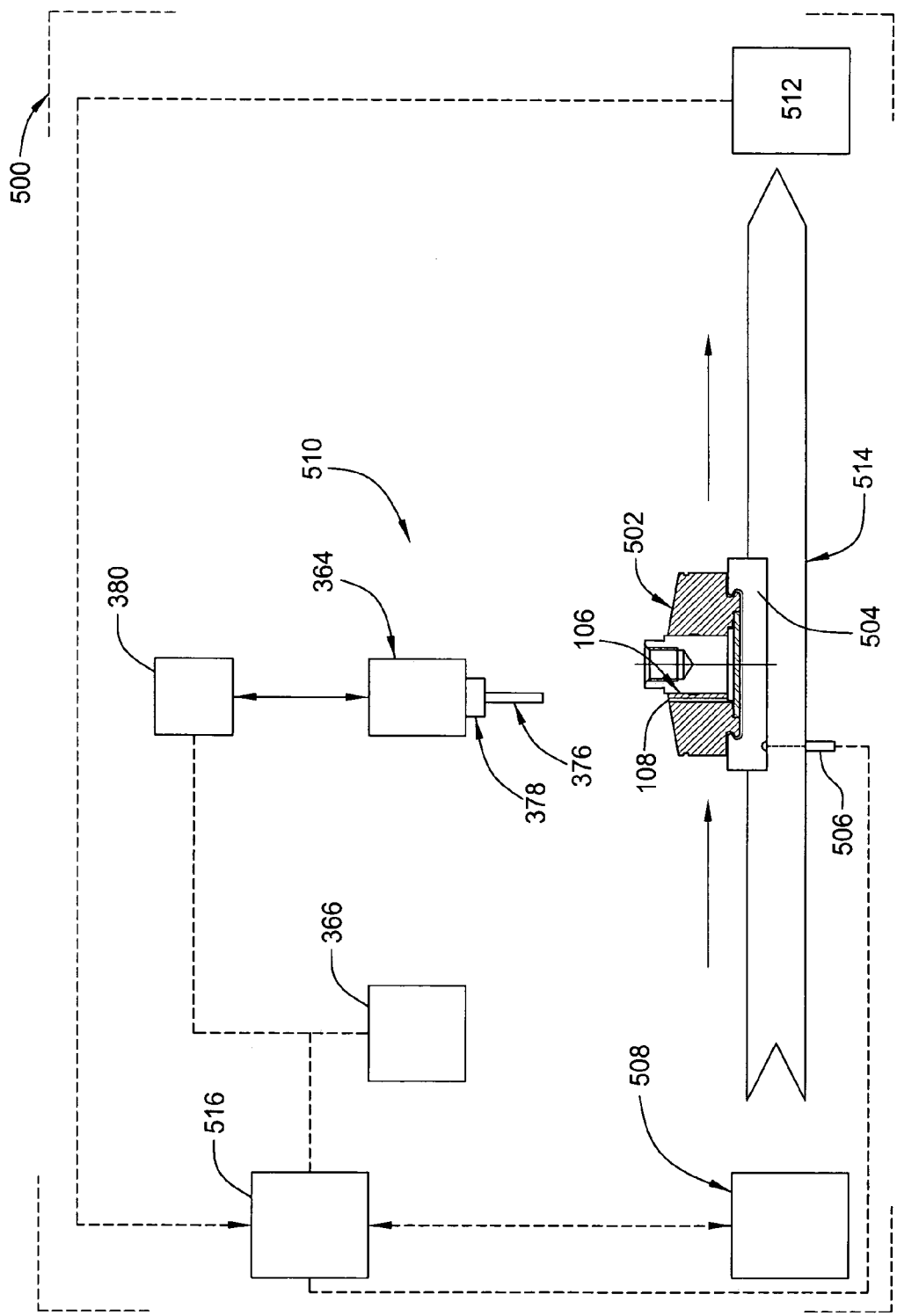
FIG. 5 depicts a simplified schematic of one embodiment of an automated fluid dynamic bearing motor assembly system having a fluid bearing filling station.

FIG. 5 is a simplified schematic of one embodiment of an automated fluid dynamic bearing motor assembly system 500 having a fluid bearing filling station 510. The system 500 includes at least one pre-filling station 508 and at least one post-filling station 512 where at least a portion of motor 502 assembly is respectively performed.

An automated transfer device 514 couples the stations 508, 510, 512. The transfer device 514 includes a pallet 504 that moves along a track 506 between the stations 508, 510, 512. The pallet 504 is configured to transport the motor 510 between the stations 508, 510, 512, and in the embodiment depicted in FIG. 5, incorporates a fixture that retains the motor 502 in a predefined position relative to the stations 508, 510, 512.

The fill station 510 is configured similar to the station 360 described above and is adapted to inject lubricant into a bearing 106 of the motor 502. As the pallet 504 moves into the fill station 510 from the pre-fill station 508, the pallet 504 causes a sensor 506 to change in state indicating the proper position of the pallet 504 and motor 502 disposed thereon relative to the station 510.

A controller 516, in response to the change in state of the senor 506, being a fill process, such as that described above with reference to FIGS. 1–4. For example, an applicator 364 may be urged into contact with the motor 502 such that a seal 378 seals a needle 376 to an injection port 108 of the motor bearing 106 allowing a fluid transfer device 366 to inject lubrication fluid into the bearing 106 with sufficient pressure to expel air trapped within the bearing 106. Upon completion of the lubrication fluid fill process, the pallet 504 transports the filled motor 502 to the post-filling station 512 where additional components are assembled to the motor 502.

Thus, a method and apparatus has been provided for filling a FDB motor with lubrication fluid. As the invention substantially eliminates trapped air while providing a predefined volume of fluid into the fluid dynamic bearing of the motor, robust and reliable disk drive operation is advantageously enhanced.

What is claimed is:

1. A method for filling a motor having a fluid dynamic bearing, the bearing having at least two passages coupling the bearing to the surrounding environment, comprising:
   moving a fluid injection tool into contact with the fluid bearing motor;
   sealing the fluid injection tool to the fluid bearing motor; and
   injecting fluid from the fluid injection tool into a first passage coupled to the fluid dynamic bearing.

2. The method of claim 1, wherein the step of injecting further comprises:
   inserting a hollow needle having a fluid outlet port into the recirculation passage.

3. The method of claim 1, wherein the step of sealing further comprises:
   compressing a seal disposed between the fluid injection tool and the fluid bearing motor.

4. The method of claim 3, wherein the step of sealing further comprises:
   moving the seal downward against the motor.

5. The method of claim 1 further comprising:
   expelling air from the bearing through the second passage.

6. The method of claim 5, wherein the step of expelling air further comprises:
   pressurizing the fluid between about 80 to about 90 psi.

7. A method for filling a motor having a fluid dynamic bearing, the bearing having at least two passages coupling the bearing to the surrounding environment, comprising:
   inserting a fluid injection needle coupled to a fluid injection tool into the first passage;
   compressing a gasket coupled to the fluid injection tool against the fluid bearing motor, thereby sealing the needle within the first passage;
   transferring fluid from the fluid injection tool through the needle and into the fluid dynamic bearing motor; and
   separating the injection tool and gasket coupled thereto from the fluid dynamic bearing motor.

8. The method of claim 7 further comprising:
   expelling air from the bearing through the second passage.

9. The method of claim 8, wherein the step of expelling air further comprises:
   pressurizing the fluid between about 80 to about 90 psi.

10. A method for filling a motor having a fluid dynamic bearing, the bearing having at least two passages coupling the bearing to the surrounding environment, comprising:
    advancing a fluid dynamic bearing motor to a fluid injection station;
    actuating a fluid injection tool toward the fluid dynamic bearing motor disposed in the station;
    transferring fluid from the injection tool to the fluid dynamic motor;
    separating the injection tool from the fluid dynamic bearing motor; and
    advancing the filled fluid dynamic bearing motor away from the injection station.

11. The method of claim 10, wherein the actuating step further comprises:
    compressing a gasket against the fluid dynamic motor to seal the injection tool to the fluid dynamic injection motor.

12. The method of claim 11, wherein the actuating step further comprises:
    inserting a fluid injection needle circumscribed by the gasket into the recirculation passage of the fluid dynamic bearing motor.

* * * * *